United States Patent [19]

Janus et al.

[11] Patent Number: 4,817,696
[45] Date of Patent: Apr. 4, 1989

[54] PNEUMATIC TIRE BEAD CORE RING FOR ANCHORING A CARCASS

[75] Inventors: Jonny Janus, Kreuzstrasse 53, D-4000 Duesseldorf 1; Gert Vaubel, Warburg-Welda; Stefan Klatzer, Schloss Neuhaus; Günter Beckmann, Haltern, all of Fed. Rep. of Germany

[73] Assignees: Benteler-Werke AG, Paderborn; Jonny Janus, Dusseldorf, both of Fed. Rep. of Germany

[21] Appl. No.: 44,303

[22] Filed: Apr. 30, 1987

[30] Foreign Application Priority Data

May 3, 1986 [DE] Fed. Rep. of Germany ....... 3615138

[51] Int. Cl.4 .............................................. B60C 15/04
[52] U.S. Cl. .................................... 152/540; 152/547
[58] Field of Search ............... 152/539, 540, 544, 545, 152/552, 554; 156/136, 135; 249/1.5

[56] References Cited

U.S. PATENT DOCUMENTS 3,942,574  3/1976  Bantz .................................. 152/540
4,320,791  3/1982  Fujii et al. ...................... 152/547 X
4,557,307  12/1985 Philpott .............................. 152/539

FOREIGN PATENT DOCUMENTS 0105806  6/1983  Japan .................................. 152/545
1042861  9/1966  United Kingdom ................ 152/540
2123360  2/1984  United Kingdom ................ 152/540

Primary Examiner—Michael W. Ball
Assistant Examiner—Geoffrey L. Knable
Attorney, Agent, or Firm—Foley & Lardner, Schwartz, Jeffery, Schwaab, Mack, Blumenthal & Evans

[57] ABSTRACT

Disclosed is a rubber pneumatic tire for vehicles which has two beads for bearing against the rim of a wheel. Embedded in each bead is a core ring which has a shaped ring and around which a carcass insert which is embedded into the rubber material of the tire is laid, for anchoring same. Each shaped ring comprises a material which chemically bonds to the rubber material, and contains a winding of high-strength fibres, which is laid in the shaped ring and which holds together and strengthens the shaped ring.

8 Claims, 4 Drawing Sheets

PNEUMATIC TIRE BEAD CORE RING FOR ANCHORING A CARCASS

BACKGROUND OF THE INVENTION

The invention relates to an improved rubber pneumatic tire for vehicles which has two beads which lie on the rim of a wheel and in each of which is embedded a core ring around which is laid a carcass insert which is embedded into the rubber, for anchoring the insert. The invention also relates to a process for the production of such pneumatic tires.

It is known for the core rings which are arranged in the beads of pneumatic tires to be made from metal such as steel, for example in the form of shaped metal sheet or wires which are wound in a portionwise manner.

As metals such as steel do not have any particular affinity for the rubber of pneumatic tires, problems are involved in joining the known core rings to the tire material. The elastic bent individual wires have a tendency to spring back, as a result of the bending stress. Upon vulcanisation, that is to say when the rubber is briefly fluid, in the worst cases the above-indicated phenomenon results in structural disorder in the core rings. Added to that is the fact that, by virtue of the specific gravity of the core ring being markedly different from the rest of the tire material and also by virtue of the specific form of the core ring, the core ring represents a source of imbalance phenomena, the disadvantageous effect of which increases in proportion to a lighter tire construction and in proportion to an increasing speed of travel that the tire is designed to withstand.

As the conventional core rings are enclosed by the incoming ends of the carcass insert, that structure gives stiffened bead regions which extend to a substantial distance into the side walls of the tire, so that the comfort properties of the tire suffer as a result.

SUMMARY OF THE INVENTION

The invention is based on the problem of providing a rubber pneumatic tire for vehicles which was improved core rings in its beads, which core rings on the one hand can be satisfactorily and durably integrated into the material surrounding same and which on the other hand can be of a lighter and more uniform construction than previously known core rings. The invention also seeks to provide that handling of the tire during the fitting operation is facilitated by virtue of improved flexibility in respect of the beads. Finally the invention seeks to provide that a reduction in the necessary structural height of the carcass support arrangement provides greater latitude in order either to provide a higher level of springing comfort with the same tire cross-sectional height or, with the same level of springing comfort, to reduce the cross-sectional height of the tire, to the favour of a larger rim or brake diameter.

To solve that problem, in a rubber pneumatic tire of the general kind set forth in the opening part of this specification, it is proposed that each shaped ring comprises a material which bonds chemically to the rubber, and includes a winding of high-strength fibres, which is inserted into the shaped ring.

The shaped ring is formed on the one hand from tough material which is compatible with the rubber of the tire, that is to say material which can be durably bonded to the rubber, so that there is no fear of separation phenomena and material breakages or failures between the tires material and the core rings, even under the influence of squeezing or squirming phenomena which occur in operation. Added to that is the fact that the shaped ring according to the invention includes a winding of strand material which, in contrast to the previously known core rings, is so-to-speak endlessly wound and accordingly has as good as no join which can give rise to imbalance phenomena. On the contrary the winding of preferably super-fine strand material or fibres is laid into the shaped ring which is stable in respect of its shape, using a bonding agent which is initially fluid and which later gels, such as liquid rubber, in such a way that the shaped ring is held together to form a non-extensible ring, without any necessity for the ends of the material forming the shaped ring to be durably connected together at a join. That means that the shaped ring also cannot cause any imbalance.

The elastic but incompressible matrix prevents displacement of the filaments relative to each other and thus ensures an adequate level of inherent strength in the bunch of fibres.

The fibre or strand material forming the winding may be a thread, a group of threads, a yarn, a braid or cord, a monofilament or a multifilament yarn (6 to 20 u), but likewise also a yarn which is twisted from a plurality of strands, or a narrow strip or ribbon. It is important that the winding comprises a comparatively large number of very fine filaments and turns in order to give the core ring the necessary strength, flexibility and security. The shaped ring which is stable in respect of shape and which is resistant to bending imparts the desired external configuration to the core ring and protects the strand material which is wound thereinto from direct bending loading both in the radial and in the axial direction of the tire, while the strand material provides for holding the shaped ring together and gives the necessary stability in respect of stretching.

Preferably, the core ring according to the invention is provided with a cover means which encloses the side of the shaped ring which is initially open for winding in the strand material, the cover means preferably being in the form of a ring which may be of a strip-like configuration. The cover means is applied to the core ring after the strand material has been wound into the shaped ring. In that connection, the cover means is preferably disposed at such a radial spacing from the winding which lies in the shaped ring, that a tire carcass insert which is provided between the two is held fast so that the enveloping portion of the carcass insert cannot come loose from the core ring in manufacture of the tire, namely in the expansion and vulcanising operations. The cover means may be positively joined to the shaped ring, for example by virtue of the cover means and/or the shaped ring being of a given configuration. The cover means may also have a further configuration which extends in a direction towards the winding in the shaped ring in order to provide a kind of positive connection between the cover means and the carcass insert which is disposed beneath it.

Although the shaped ring and the cover ring preferably comprise solid flat material which is possibly of a profiled configuration, depending on the capacity of the material thereof for being joined to rubber, they may also have apertures therethrough, through which the rubber material can engage. In that respect it is also possible for the cover ring to comprise a fabric or a mesh-like belt or strip.

Preferably at least the shaped ring and preferably also the cover ring comprise plastics material whose specific gravity is between 1 and 1.5 and, in a particularly advantageous manner, from 1 to 1.2. Accordingly, it is possible entirely to eliminate metal such as steel for the core ring.

The strand material which is wound into the shaped ring is preferably yarn or thread material which has a high level of tensile strength, for example consisting entirely or predominantly of carbon or aramide fibres, and it should have a specific gravity of between 1.3 and 2.6 and preferably 1.5.

Accordingly, by virtue of using fine filaments with a comparatively small amount of material being used, that arrangement provides a winding in the core ring which is of high strength but unusually flexible and which imparts to the core ring the necessary stability in respect of undesired stretching phenomena. The shaped ring which encloses the winding and possibly also the cover ring protect such thread or strand material which can be highly sensitive to bending from disadvantageous loadings which can originate from the carcass insert which is passed around the core ring, particularly in the operation of swelling or expanding the pneumatic tire, in the vulcanisation treatment in the cavity of the tire shaping press, or upon fitting thereof.

If the individual components of the core ring comprise the above-indicated materials, then the core ring is of a similar or almost identical specific gravity to the rubber of the tire. Accordingly, not only can the core ring be anchored in a detachment-proof manner in the respective tire bead, but, depending on the specific gravity, it can also be integrated in the tire material so that the bead core ring cannot cause any undesirable imbalance phenomena which, with the known core rings, repeatedly occur due to concentrations of weight or heavy points, because of the higher specific gravity thereof.

In accordance with a preferred practical embodiment of the invention the shaped ring forms a kind of trough or depression for accommodating the fibre or strand material which is wound therein. In that way the strand material can be almost completely enclosed by the shaped ring. Accordingly, it is substantially protected by the shaped ring from direct contact with the carcass insert which is laid around the core ring. The tensile forces or the like which originate from the carcass insert are substantially transmitted to the shaped ring which, by virtue of its trough-like configuration, prevents such forces from applying harmful bending loadings to the fibre or strand material which is wound in the shaped ring. The shaped ring is of such a shape that the carcass insert can be laid around the outside thereof, in other words, the shaped ring does not have any sharp edges or corners which would result in disadvantageous loadings and stresses in the carcass insert, but it is of a contour which permits a smooth entry.

On the other hand the core ring is such that it can hold the end of the carcass insert which is laid therearound, sufficiently firmly as reliably to prevent the laid-around portion of the carcass insert from reverting to its initial shape, even during the vulcanising operation in the tire shaping press. That embodiment is also particularly advantageous in regard to steel cord carcasses, as are used for example in truck tires. That is preferably achieved in that the cover ring which forms a kind of bandage applies a certain clamping action to the end of the carcass insert which extends into the core ring according to the invention, that being achieved by suitable dimensioning of the diameter of the cover ring (stressing) and possibly by virtue of a certain profiling of the surface of the cover ring which acts against the carcass insert to prevent it from slipping off.

BRIEF DESCRIPTION OF THE APPLICATION DRAWINGS

Embodiments of a core ring according to the invention for rubber pneumatic tires are illustrated in diagrammatic form in the drawings, on a greatly enlarged scale. In the drawings.

Figure 3:
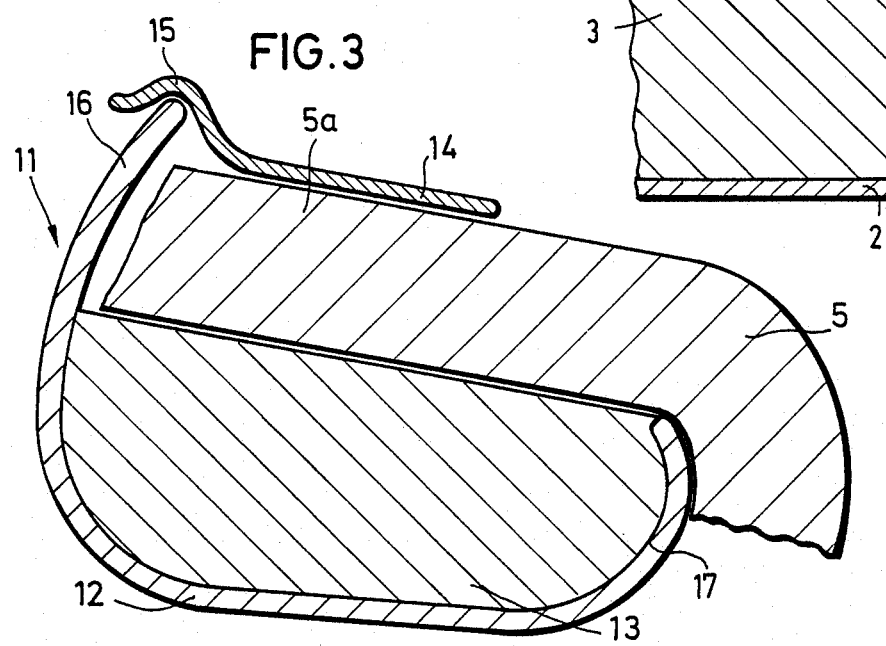
Figure 4:
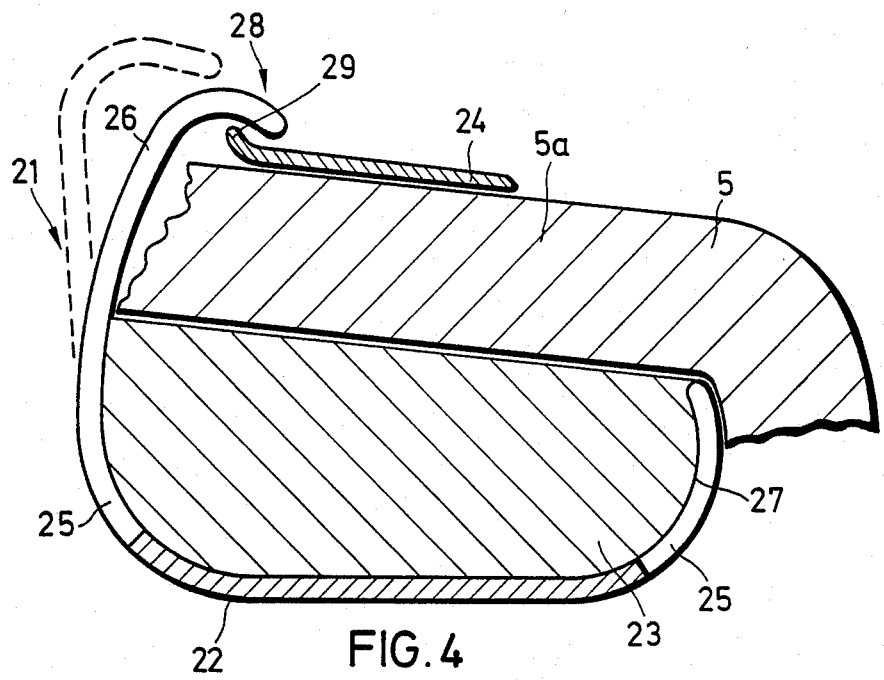
Figure 5:
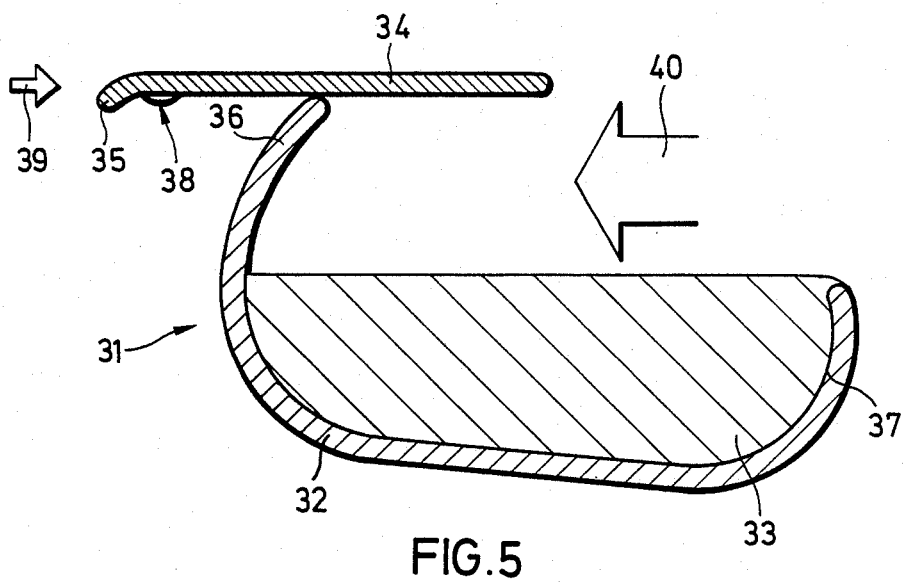
Figure 6:
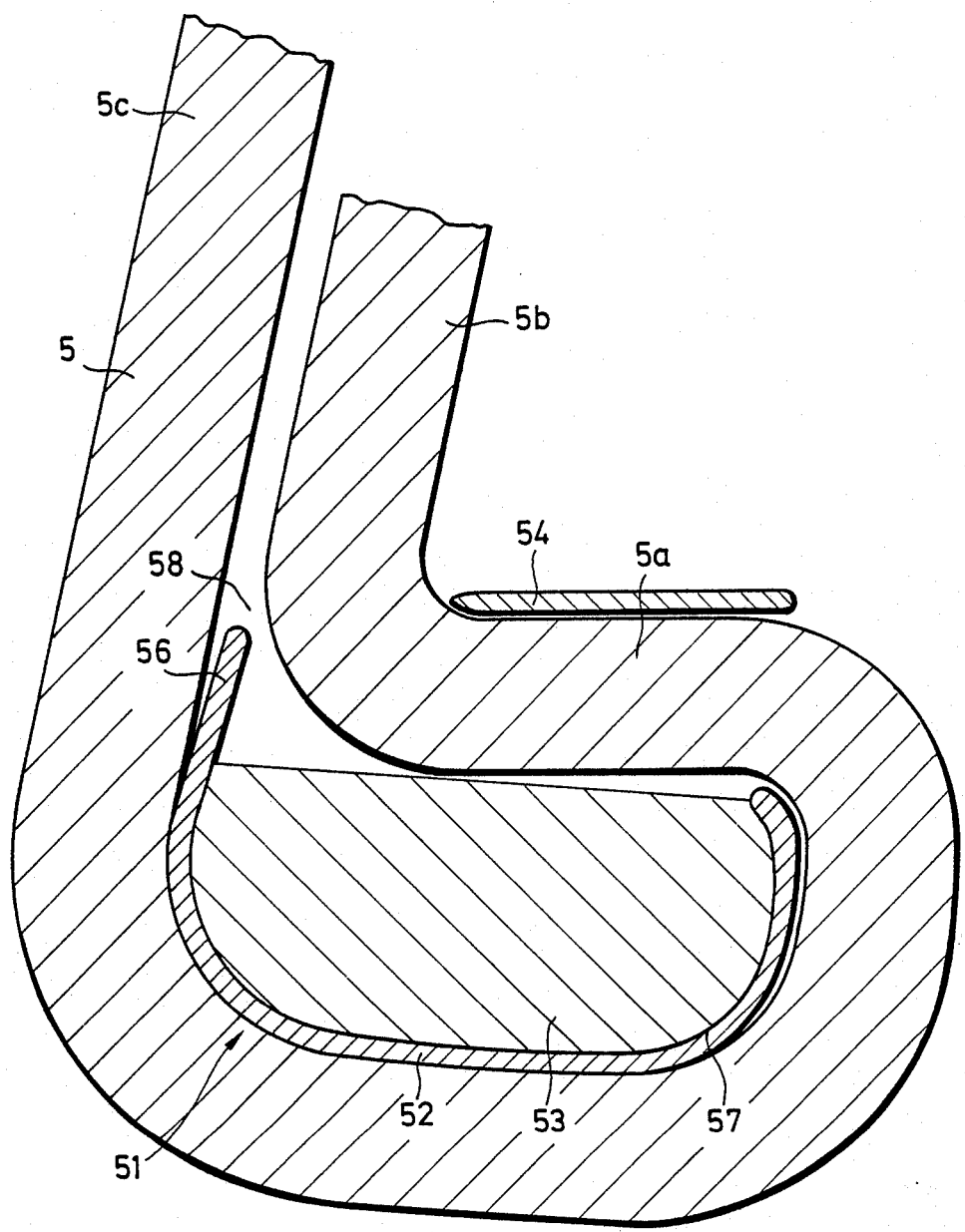
Figure 7:
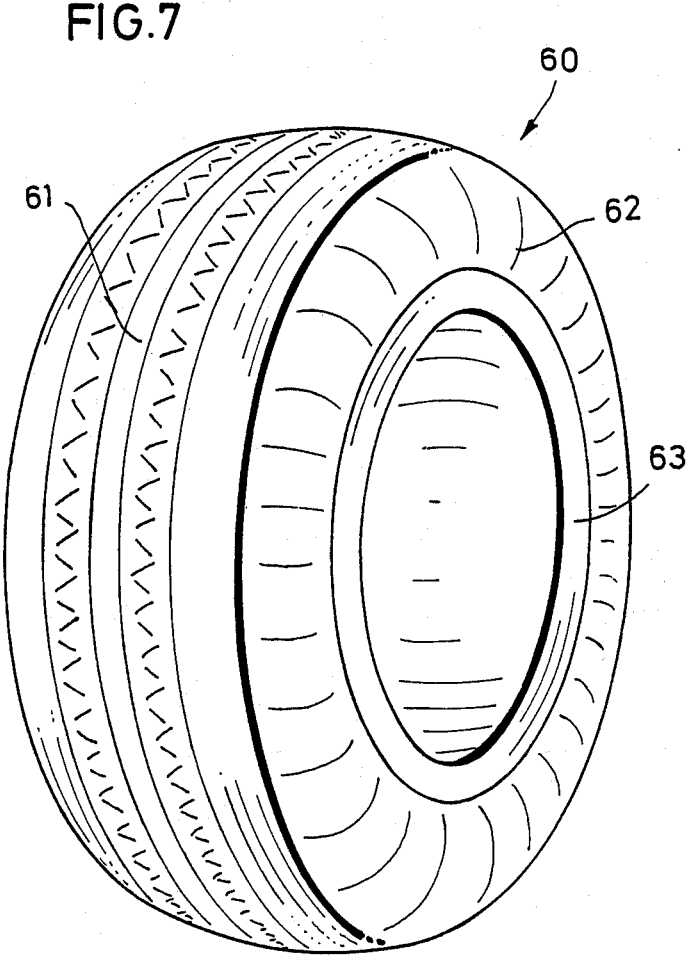

FIG. 3 is a view in cross-section through a modified embodiment of the core ring, FIG. 4 is a view in cross-section of a further modified embodiment of the core ring, FIG. 5 is a view in cross-section of yet another embodiment of the core ring, indicating how the carcass insert which is to be passed around the core ring is fixed thereto, FIG. 6 is a view in cross-section of a fifth embodiment of the core ring wherein the inserted end of the carcass insert projects out of the core ring, and FIG. 7 is a perspective view of a pneumatic rubber tire, showing one of the two tire beads containing a core ring according to the invention.

DETAILED DESCRIPTION OF THE PREFERRED EMBODIMENT

Figure 1:
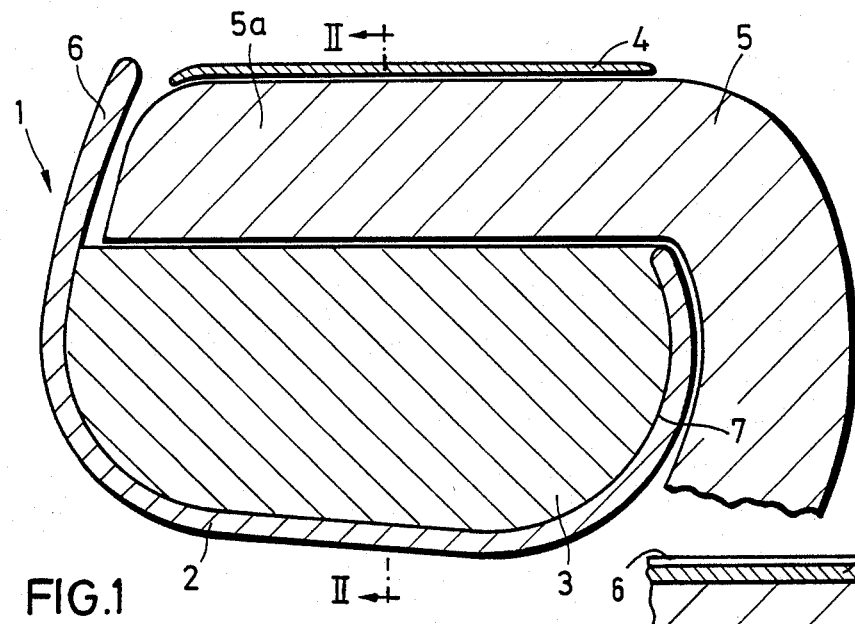
FIG. 1 is a view in cross-section through a first embodiment of the core ring.
Figure 2:
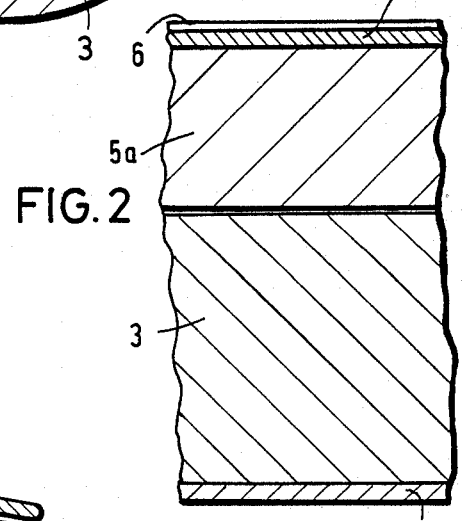
FIG. 2 is a view in longitudinal section taken along line II—II in FIG. 1.

The core ring 1 shown in FIGS. 1 and 2 comprises an outer shaped ring 2 which is stable in respect of its shape, a winding 3 which is laid therein and which comprises fine strand material which is not illustrated in detail herein and which forms a homogeneous mass in cross-section, and a bandage-like cover ring 4. A carcass insert 5 is wound or laid around the core ring 1. The end 5a of the carcass insert 5 is held between the cover ring 4 and the winding 3, for example by being clamped fast. For the sake of enhanced clarity of the drawing, spaces are shown therein between the carcass insert 5 or the end 5a thereof and the portions of the core ring 1. In actual fact however the carcass insert 5 bears against the outside of the shaped ring 2, which has rounded-off sides, and also the winding in the shaped ring 3, over the entire surface areas thereof, while the cover ring 4 presses with a certain degree of prestressing from the outside against the end 5a of the carcass insert 5, which is fitted in the shaped ring 2, in order to secure that end 5a to the core ring 1.

At the entry side of the carcass insert 5 the shaped ring 2 is provided with an upstanding and outwardly extending limb portion 6 in the form of a bent horn which protects the inserted end 5a of the carcass insert 5 and ensures that the carcass insert can be wrapped around the core ring, without the risk of bending.

The winding 3 in the ring 2 substantially fills a trough configuration 7 which is formed by the shaped ring 2, by virtue of the specific shape thereof, so that the end 5a of the carcass insert 5 lies flat on the winding 3 and extends as far as the horn-like portion 6 (see FIG. 1).

The embodiment shown in FIG. 3 differs from the core ring shown in FIG. 1 substantially in that the core ring 11 contains a winding 13 which fills the trough configuration 17 of the shaped ring 12 in such a way that the end 5a of the carcass insert 5, which fits in the core ring 11, extends in the core ring 11 in a lying-flat condition with a slight degree of inclination towards the horn-like portion 16 of the ring 12. The FIG. 3 embodiment of the core ring also differs in that the cover ring 14 is of a conical configuration and has a nose-like configuration at 15 which fits on to the outer end of the portion 16 of the shaped ring 12 in the manner of a snap connection and thus produces a positive connection between the shaped ring 12 and the cover ring 14.

In the embodiment shown in FIG. 4 the shaped ring 22 of the core ring 21 is provided in the region of its horn-like portion 26 with an extension portion 28 which can engage over the conical clamping ring 24 in the manner of a snap-type fixing. For that purpose, the ring 24 has an upwardly projecting limb portion 29. In that arrangement, the shaped ring 22 has radial incisions or slots 25 in order to improve its flexibility.

The trough configuration 27 formed by the shaped ring 22 is filled with a winding 23, in a similar fashion to the embodiment shown in FIG. 3. The winding 23 is preferably wound from a single thread or also strand material which can be formed from a plurality of threads or the like, thus providing practically an endless winding which is as good as stretch-free and which is extraordinarily flexible due to the super-fine cross-sections of the individual filaments, so that the risk of breakage is very low and the levels of stability and security of the core ring are very high. As the winding 23 is practically endless, there are no joins which could result in weak points in the material, and imbalances therein.

The core ring 31 shown in FIG. 5 is similar to that shown in FIG. 1, but the cover ring 34 has a nose portion 35 which engages over the upper end of the horn-like portion 36 of the shaped ring 32, and also, at the underside, one or more projecting securing knobs 38 so that, when the cover ring 34 has been pushed completely on to the shaped ring 32 in the direction indicated by the arrow 39, it forms a positive snap connection with the shaped ring 32 and is accordingly secured against slipping off.

In the assembly operation, the end (not shown in FIG. 5) of the carcass insert which is wrapped around the core ring 31 is pushed in the direction indicated by the arrow 40 on to the winding 33 in the trough configuration 37 of the shaped ring 32 until its end lies close to the inside of the portion 36 of the ring 32. The clamping ring 34 is then pushed in the opposite direction, as indicated by the arrow 39, on to the ring 32 and the inserted end of the carcass insert, in order to press the end of the carcass insert against the winding 33 in the manner of a clamping ring and thus to fix it to the shaped ring.

In the embodiment shown in FIG. 6 the core ring 51 comprises a shaped ring 52 which is of a similar configuration to the shaped ring shown in FIG. 1 and which forms a trough configuration 57 in which there is disposed a winding 53 of high-strength fibre or yarn material. Disposed at the entry side of the carcass insert 5 is an upwardly extending portion 56 of a horn-like configuration, with a bent or curved contour, so that the carcass insert 5, in a suitably bent configuration, can be laid around the core ring 51 and can be bent back in such a way that its inserted end 5a lies on the flat top side of the winding 53.

Disposed in turn on the outside of the core ring 51 is a cover ring 54 which presses the inserted end 5a of the carcass insert 5 with a certain level of prestressing against the winding 53 in the trough configuration 57 of the ring 52, and thus holds it fast in position. Between the cover ring 54 and the upwardly extending portion 56 of the ring 52 is an opening 58 through which passes the outermost end 5b of the inserted end 5a of the carcass insert 5. That outermost end 5b is passed through the opening 58 in such a way that it extends parallel to the portion 5c of the carcass insert 5 which comes out of the side wall of the tire, and extends in the direct vicinity thereof, as shown in FIG. 6.

In the FIG. 6 embodiment of the core ring, the inserted end 5a of the carcass insert 5 is particularly securely held to the core ring.

Poly-(2,6-dimethyl-1,4-phenylene ether) has been found to be a particularly suitable plastics material for the shaped ring.

FIG. 7 shows a complete pneumatic rubber tire 60 which has an outer annular tread surface 61 which at both sides blends into curved side walls 62 which in turn each terminate in an annular bead 63 which is intended for bearing against a rim (not shown) of a vehicle wheel and in which a core ring according to the invention is embedded.

In the embodiment described the shaped ring (2, 12, 22, 32, 52) and/or the cover ring (4, 14, 24, 34, 54) preferably comprise plastics material and are of an approximately uniform wall thickness to about 2 mm. The shaped ring (22) and/or the cover ring (4, 54) may include apertures therethrough. The cover ring (4, 54) may be composed of an open mesh or fabric.

The winding (3, 13, 23, 33, 53) is preferably of smaller extent in cross-section in the radial direction than in the lateral direction. The strand material (3, 13, 23, 33 and 53) forming the winding comprises high-strength fibres such as carbon or aramide fibres, for example in the form of rovings, threads or yarn material.

The parts of each core ring (1, 11, 21, 31) desirably comprise material which has the same or similar specific weight as the rubber of the tire.

In the preferred form the plastics shaped ring (2, 12, 22, 32, 52) has a specific gravity of between 1 and 1.5 and preferably 1 to 1.2 and the strand material of the winding (3, 13, 23, 33, 53) has a specific gravity of between 1.3 and 2.6, preferably 1.5. The shaped ring (2, 12, 22, 32, 52) may comprise PPE-bearing material.

The invention also concerns a process for the production of a rubber pneumatic tire for vehicles which has a carcass embedded in rubber material and two annular beads which are to be applied to the rim of a vehicle wheel, wherein embedded in each bead is a core ring around which is laid one side of the carcass, in which the carcass is laid around the core rings and the whole is introduced into rubber material and the tire blank produced in that way is vulcanised. In the new process the core ring is formed from a shaped ring and a winding of synthetic strand material which is laid therein, and the fibre material of the winding, prior to being wound in the shaped ring, is impregnated with a material which is initially fluid and which later gels and which vulcanises out to form a matrix. This material which vulcanises out to form a matrix is a functionalised polybutadiene in order to prevent displacement of the fibres and/or filaments relative to each other.

The surface of the shaped ring is coated with SBR (styrene-butadiene rubber)-bearing material prior to the fitting of the carcass. A carcass with SBR-bearing rubber material may be used. After the winding has been fitted into the shaped ring, a cover means, for example in the form of a ring, is applied to the winding. This cover means can be pushed on to the shaped ring from the side or in the axial direction of the shaped ring.

What is claimed is:

1. A bead core ring for a rubber tire having a carcass, said bead core ring comprising a shaped ring having a limb portion and an opposing end portion defining a trough therebetween, a winding of strands disposed in said trough, said limb portion of said shaped ring extending outwardly beyond the winding in said trough and said opposing end portion, cover means comprising a flat plastic ring, said cover means and said opposing end portion defining a laterally open area therebetween adapted to receive an end portion of said carcass, said cover means and said shaped ring adapted to coact to secure a carcass to said core ring.

2. A bead core ring as claimed in claim 1 in which the cover means and the shaped ring are of a configuration such that they can be positively interconnected.

3. A bead core ring as claimed in claim 1 wherein the shaped ring has a rounded-off, trough-like configuration for accommodating the fiber winding.

4. A bead core ring as claimed in claim 3 in which said trough is partially filled by said winding.

5. A bead core ring as claimed in claim 1 wherein the shaped ring is generally U or L shaped in cross-section.

6. A bead core ring as claimed in claim 1 in which the cover means is so arranged that an opening is provided between said cover means and the limb portion of said core ring, adapted such that a carcass end extending between the winding and the cover means will extend through said opening, to lie close to an incoming carcass end.

7. The bead core ring of claim 1 wherein said winding comprises relatively fine strands of fiber contained with a bonding agent which is initially fluid and subsequently gels to prevent displacement of the strands relative to each other and to form an annular matrix.

8. A bead core ring as claimed in claim 2, wherein said flat plastic ring is provided with an outwardly projecting end portion adjacent said limb portion of said shaped ring, said limb portion being adapted to extend over said outwardly projecting end portion so as to provide a positive connection between the shaped ring and said flat plastic ring.

* * * * *